Mar. 20, 1923.

K. SCHENKEL

BAND SAWING MACHINE

Filed Mar. 23, 1922

Inventor:
Kurt Schenkel

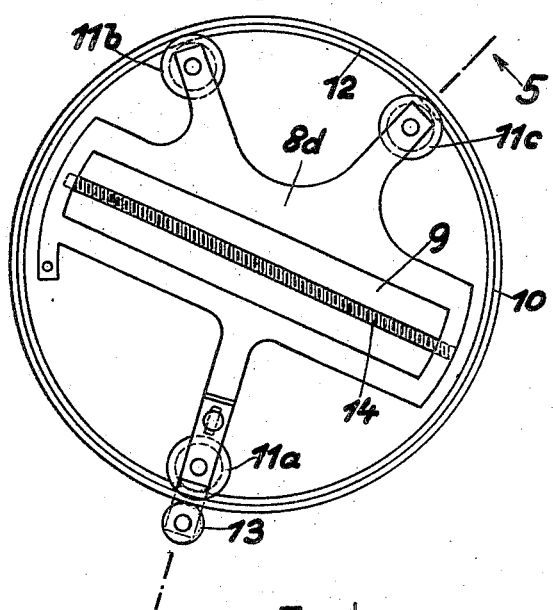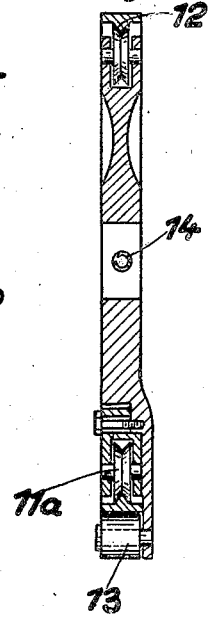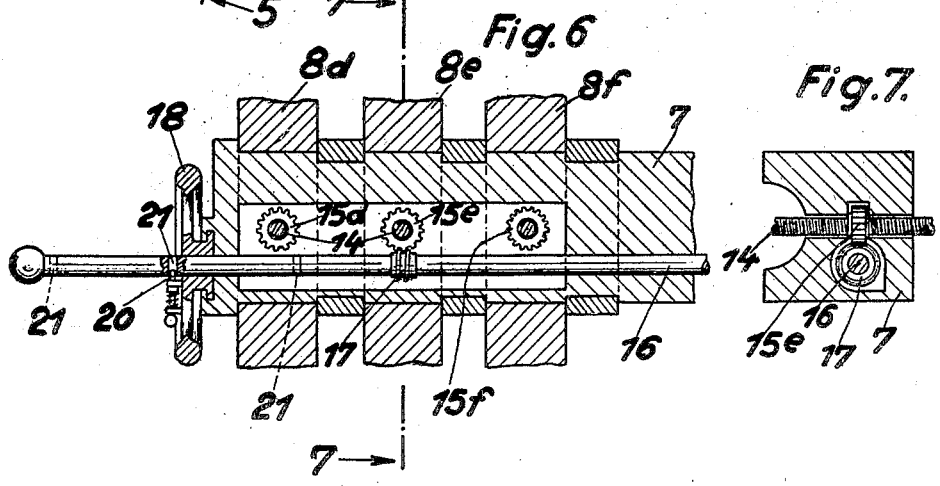

Mar. 20, 1923.

K. SCHENKEL 1,449,015

BAND SAWING MACHINE

Filed Mar. 23, 1922 4 sheets-sheet 4

Inventor:
Kurt Schenkel

Patented Mar. 20, 1923.

1,449,015

UNITED STATES PATENT OFFICE.

KURT SCHENKEL, OF STRELITZ-ALT, GERMANY.

BAND SAWING MACHINE.

Application filed March 23, 1922. Serial No. 546,123.

*To all whom it may concern:*

Be it known that I, KURT SCHENKEL, a citizen of the German Republic, residing at Strelitz-Alt, Germany, have invented new and useful Improvements in a Band Sawing Machine, of which the following is a specification.

My present invention relates to a band sawing machine and especially to a machine of this character wherein a plurality of saw ribbons are actuated from a single driving pulley. It is the object of my invention to provide improved means whereby the cutting plane of each saw ribbon may be adjusted relatively to the cutting planes of the adjoining saw ribbons. It is a further object of my invention to provide improvements whereby the said adjustment may be accomplished by relatively simple means and while said saw ribbons are running. Another object of my present invention is to provide an adjustable table and means in connection with said first named means whereby said table is automatically adjusted when said first named adjusting means are being actuated to alter and adjust the sawing plane of any of the saw ribbons employed in the sawing machine. Further improvements relate to constructional details which I will describe with reference to the drawings forming a part of this specification and in which—

Fig. 4 is an elevation of a single saw supporting ring and ring carrier.

Fig. 5 is a cross section along the line 5—5 in Fig. 4.

Fig. 6 is a part view of a cross section along the line 6—6 in Fig. 1.

Fig. 7 is a cross section along the line 7—7 in Fig. 6.

Figure 1:
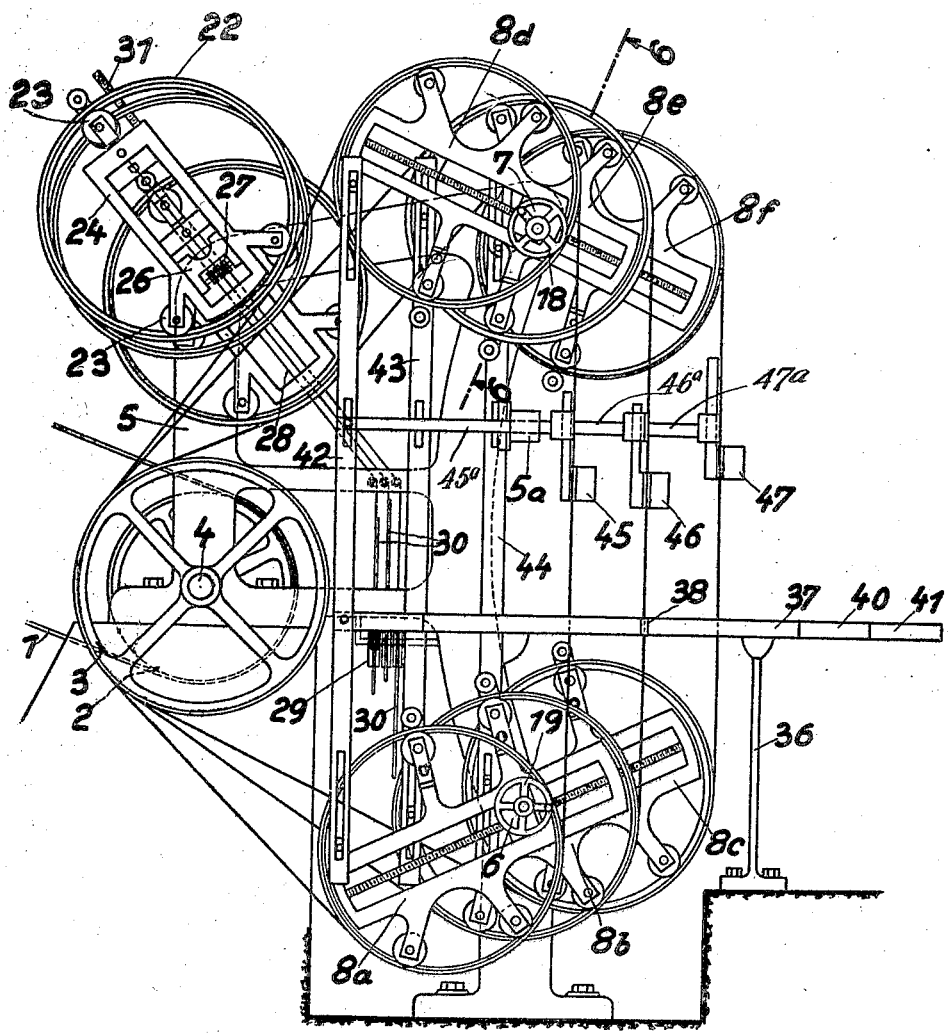
Fig. 1 is an elevation of my improved machine seen in the direction of the sawing planes.
Figure 3:
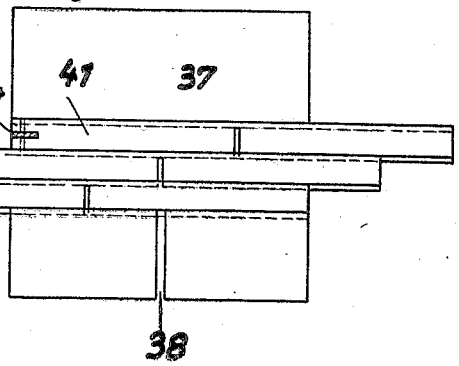
Fig. 3 is a plan view of the novel table.
Figure 2:
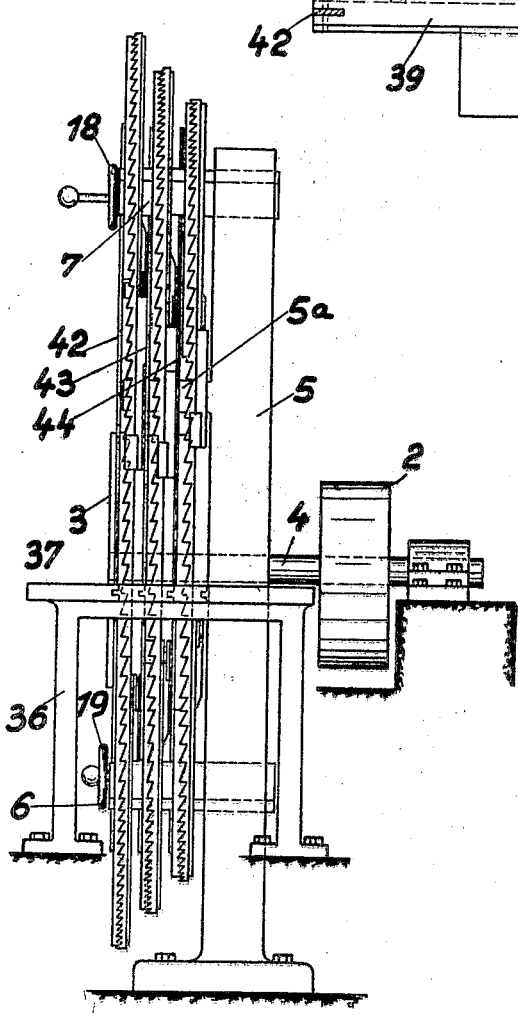
Fig. 2 is an elevation seen at a right angle to the sawing planes.

In Fig. 1 the pulley for transmitting movement to the plurality of saw ribbons employed is designated 3. This saw ribbon driving pulley 3 receives its power of rotation by means of a belt 1 and a belt pulley 2 from a power source not shown. The belt pulley 2 and the saw ribbon driving pulley 3 are both mounted on a shaft 4, one bearing of which may be supported within the main machine frame 5. The latter carries, on a lower and an upper extension, a pair of horizontally projecting beams 6 and 7 respectively of, preferably, square shaped section. These lower and upper beams 6 and 7 serve as supports for the saw ribbon ring carriers $8^a$, $8^b$, $8^c$, and $8^d$, $8^e$, $8^f$, respectively, and, moreover, contain the means for adjusting said carriers. Each saw ribbon ring carrier consists of a three-armed structure with a frame-like opening 9 that extends diametrically within the saw ribbon ring 10 which is carried on the arms of said structure by means of anti-friction rollers $11^a$, $11^b$, $11^c$ which, by means of circumferential grooves, co-act with an interior running rib 12 provided within each ring 10. One of said rollers, for instance, the roller $11^a$, may be radially adjustable, and I prefer to provide this adjustable roller with an abutment roller 13 disposed so as to relieve the diametrically disposed rollers $11^b$ and $11^c$ of any excessive pressure exerted by the saw ribbon passing around a portion of the circumference of each ring. The longitudinal opening 9 of each carrier is dimensioned so as to fit the supporting square beam on which it is movable to almost the extent of its longitudinal dimension. And the supporting square beams 6 and 7 are so disposed relatively to each other that each pair of saw ribbon ring carriers when being moved simultaneously upon said beams, approach each other or separate from each other approximately to such a degree that the length of the respective saw ribbon remains practically the same and, hence, requires no alteration.

The means for moving the saw ribbon ring carriers and arresting the same in any desired position upon the respective supporting beams are illustrated, on an enlarged scale, in Figures 4 to 7, and consist of a screw threaded spindle 14 fixedly secured within the opening 9 of each carrier and extending through the respective supporting beam (see Figures 6 and 7). Within each beam is, for each of said spindles 14, revolvingly secured an externally toothed wheel 15 engaging by means of an internal screw thread, the respective spindle for which it is provided. When any of these wheels is caused to revolve, the respective spindle is thereby moved longitudinally and causes the respective saw ribbon ring carrier to alter its position upon the supporting beam. For turning the said spindle moving wheels I have provided a shaft 16 with a worm gear 17 which can alternately be brought into engagement with any of the series of spindle moving wheels mounted within one beam, by moving said shaft axially to and fro. In front of each supporting beam I have provided a hand wheel 18 and 19, respectively, which by means of a spring actuated coupling pin 20, can be brought into engagement with a series of openings 21 or the like of the shaft 16 which openings correspond with the positions of the spindle moving wheels provided within each beam. In Fig. 6 I have shown the shaft in such a position that on turning the hand wheel 18 the wheel 15$^e$, engaging the spindle of the carrier 8$^e$, is caused to revolve.

Figure 8:
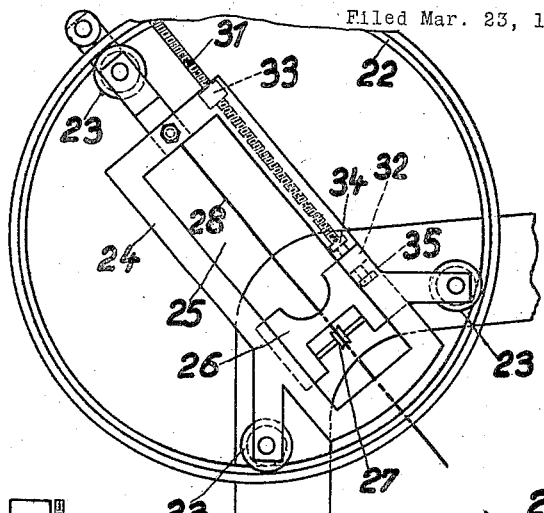
Fig. 8 shows, in elevation, an adjustable and weighted saw ribbon tensioning device constructed on the same principle as my novel saw supporting device.
Figure 9:
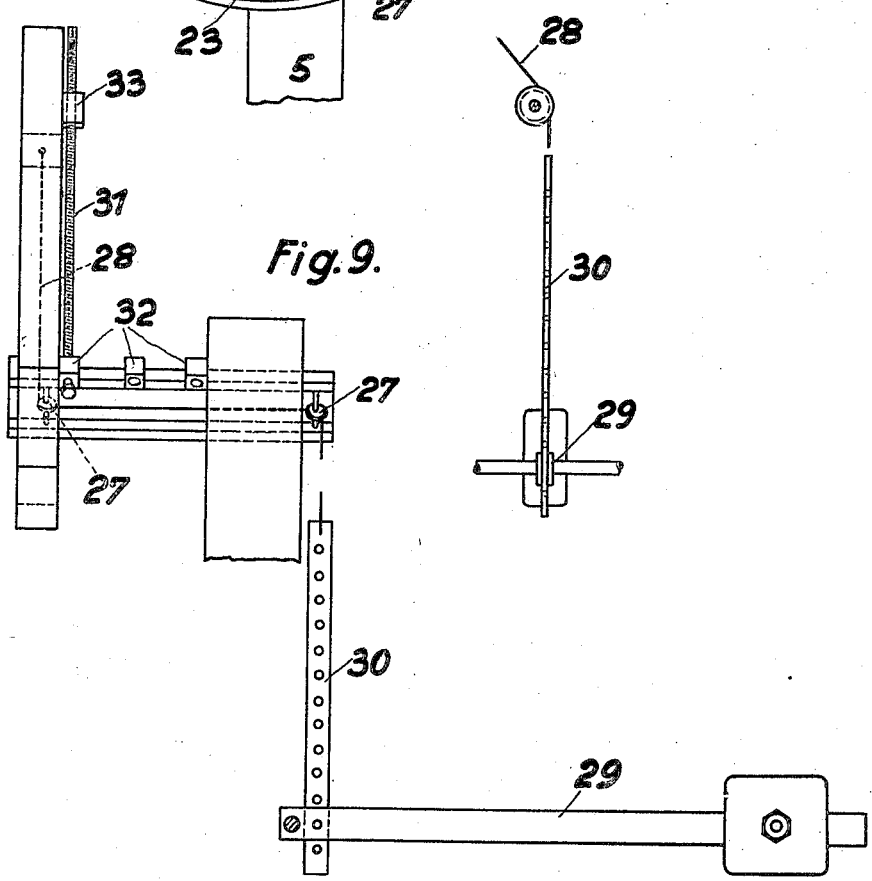
Fig. 9 illustrates, in an elevation view, my novel means for weighting each saw ribbon tensioning device.

For the purpose of maintaining each saw ribbon in a tensioned condition, I have provided, for each ribbon, a tensioning device constructed on the same principle as my novel saw ribbon supporting device. Each saw ribbon is acted upon by a revoluble ring 22 (Figs. 1 and 8) which runs on antifriction rollers 23 carried on arms of a structure 24. This structure is provided with a frame-like opening 25 into which fits a square beam 26 which is fixedly secured to the main frame 5. The beam 26 is of such a length as to be able to carry as many tensioning devices as there are saw ribbons. For each tensioning device there is provided a pair of rope pulleys 27, which are mounted within a frame-like space of the beam carrying the tensioning devices. Over each pair of pulleys 27 leads a rope 28 to a weighted lever 29. Between each rope 28 and lever 29 is interposed an adjustable rod 30 by means of which the length of each rope can be readjusted after each adjustment of the respective tensioning device. The other end of each rope is secured to the respective tensioning device structure 24. The adjustment of each tensioning device relative to the position and slackness of the respective saw ribbon is performed by means of a screw threaded spindle 31 which passes through a screw threaded projection 33 of the respective structure 24 and also through an opening of a beam projection 32. The spindle 31 is provided with two stops 34 and 35, disposed in front and at the rear of the respective projection 32 and allowing a certain to and from movement of the spindle, and the spindle carrying structure, such movements as are equalized by means of the weighted lever 29.

My novel table consists of a frame 36 and a fixedly secured top 37 which is provided with a saw ribbon introducing slit 38. Within the table top 37 I provide as many slidably mounted leaves 39, 40, 41, as there are saw ribbons. The leaves are slidable in the direction in which the saw ribbons are adjustable. Each leaf is connected with a vertical rod 42, 43, 44, respectively. Each vertical rod is connected, by means of a slit and pin connection, to a pair of saw ribbon ring carriers, whereby the position of the respective table leaf is automatically altered when a saw ribbon ring carrier is being adjusted. The saw ribbon guides 45, 46, 47, are slidably mounted within an arm 5$^a$ of the main machine frame 5 by means of rods 45$^a$, 46$^a$, and 47$^a$. The rear ends of these rods are connected to the respective table leaf rods 42, 43, and 44, and hence, are caused to partake of the adjustment of the respective saw ribbon.

I am aware that one or the other feature of my invention may be applied in machines of other types, though, I believe, that the machine I have illustrated will be the best embodiment of my invention.

What I claim as my invention and desire to secure by Letters Patent of the United States, is:

1. A band sawing machine, comprising, in combination a driving pulley, at least one saw ribbon, a pair of annular revoluble members adapted to carry said ribbon, a carrying structure for each of said annular members, and a fixed support for each of said carrying structures, said carrying structure being mounted upon said support so that said structure can be diametrically moved upon said support, means for adjusting the position of said structure upon said support whereby the cutting plane of said saw ribbon may be altered, the structure carrying surface of said supports being disposed relatively to each other so that the length of said saw ribbon requires no alteration when the position of said structures is being altered upon the respective support.

2. A band sawing machine, comprising, in combination, a driving pulley, a plurality of saw ribbons, for each saw ribbon a pair of annular revoluble members, each member being adapted to carry a saw ribbon, a carrying structure for each of said annular members, a pair of fixed supports for said carrying structures, each of said carrying structures being mounted upon the respective support so that said structure can be diametrically moved upon said support, means for adjusting the position of each structure upon the respective support, whereby the cutting plane of said saw ribbons may be altered, said means being mounted within longitudinally extending openings of said fixed supports, and the structure carrying surfaces of said supports being disposed relatively to the axis of said driving pulley so that the length of said saw ribbons requires no alteration when the position of said structures is being altered upon said carrying surfaces of the respective support.

3. A band sawing machine, comprising, in combination, a driving pulley, at least one saw ribbon, a pair of annular revoluble members adapted to carry said ribbon, a carrying structure for each of said annular members, and a fixed support for each carrying structure, said carrying structure being mounted upon said support so that said structure can be diametrically moved upon said support, means for adjusting the position of said structure upon said support, whereby the cutting plane of said saw ribbon may be altered, the structure carrying surfaces of said supports being disposed relatively to each other so that the length of said saw ribbon requires no alteration when the position of said structures is being altered upon the respective support, and a tensioning device for said saw ribbon, said device consisting of an annular revoluble member, a carrying structure for said member, a fixed support for said carrying structure, said carrying structure being mounted upon said fixed support so as to be movable towards said saw ribbon, and a weighting mechanism, whereby said tensioning device is being yieldingly pressed against said saw ribbon.

4. A band sawing machine, comprising, in combination, a plurality of saw ribbons, means for actuating said saw ribbons, means for carrying said saw ribbons, and a supporting table for the work pieces to be sawn and comprising a stationary table part and slidably mounted within said stationary part and at a right angle to the direction of feed a plurality of adjustable leaves, one leaf for each saw ribbon, each leaf being provided with an aperture for the passage of the respective saw ribbon, and said stationary table part being provided with a slit for the introduction of said saw ribbons into said apertures of said adjustable leaves.

5. A band sawing machine, comprising, in combination, a driving pulley, a plurality of saw ribbons, for each saw ribbon a pair of revoluble members, adapted to carry said ribbon, said revoluble members being mounted so that the position of each revoluble member can be altered, whereby the cutting plane of each of said saw ribbons may be altered, a supporting table for the work piece to be sawn, said table consisting of a fixed part and a plurality of adjustable leaves, one leaf for each saw ribbon, and means for connecting each of said leaves with the revoluble members of the respective saw ribbon, said last named means being adapted to cause said leaf to automatically alter its position when the position of any of the respective revoluble members is being altered.

6. A band sawing machine, comprising, in combination, a driving pulley, at least one saw ribbon, a pair of annular revoluble members adapted to carry said ribbon, a carrying structure for each of said annular members, and a fixed support for each of said carrying structures, said carrying structure being mounted upon said support so that said structure can be diametrically moved upon said support, means for adjusting the position of said structure upon said support, whereby the cutting plane of said saw ribbon may be altered, the structure carrying surfaces of said supports being disposed relatively to each other so that the length of said saw ribbon requires no alteration when the position of said structures is being altered upon the respective support, a table comprising an adjustable leaf with an opening for the passage of said saw ribbon, and means for connecting said adjustable leaf with each of said carrying structures, said means being adapted to cause said leaf to adjust its position automatically when the position of said carrying structures is being adjusted.

7. A band sawing machine, comprising, in combination, a driving pulley, a plurality of saw ribbons, for each saw ribbon a pair of annular revoluble members each member being adapted to carry a saw ribbon, a carrying structure for each of said annular members, a pair of fixed supports for said carrying structures, each carrying structure being mounted upon the respective support so that said structure can be diametrically moved upon said support, means for adjusting the position of each structure upon the respective support, whereby the cutting plane of said saw ribbon may be altered, said means being mounted within longitudinally extending openings of said fixed supports, the structure carrying surfaces of said supports being disposed relatively to the axis of said driving pulley so that the length of said saw ribbons requires no alteration when the position of said structures is being altered upon said carrying surfaces of the respective support, a tensioning device for each saw ribbon, said device consisting of an annular revoluble member, a carrying structure for said member, a fixed support for said carrying structure, said carrying structure being mounted upon said fixed support so as to be movable towards said saw ribbon and a weighting mechanism, whereby said tensioning device is being yieldingly pressed against said saw ribbon, and a supporting table for the work pieces to be sawn, said table consisting of a fixed part and a plurality of adjustable leaves, one leaf for each saw ribbon, each leaf being provided with an aperture for the passage of the respective saw ribbon, and means for connecting each adjustable leaf with the carrying structures of the respective saw ribbon, said means being adapted to cause said leaves to automatically adjust their respective position with the adjustment of the respective saw ribbon.

KURT SCHENKEL.